United States Patent
Duncan

(10) Patent No.: US 9,458,623 B2
(45) Date of Patent: Oct. 4, 2016

(54) HOUSING STRUCTURE WTH PIVOTALLY MOVABLE WALLS

(71) Applicant: Douglas Malcolm Duncan, Roodepoort (ZA)

(72) Inventor: Douglas Malcolm Duncan, Roodepoort (ZA)

(*) Notice: Subject to any disclaimer, the term of this patent is extended or adjusted under 35 U.S.C. 154(b) by 0 days.

(21) Appl. No.: 14/646,129

(22) PCT Filed: Nov. 20, 2013

(86) PCT No.: PCT/ZA2013/000087
§ 371 (c)(1),
(2) Date: May 20, 2015

(87) PCT Pub. No.: WO2014/082104
PCT Pub. Date: May 30, 2014

(65) Prior Publication Data
US 2015/0315776 A1    Nov. 5, 2015

(30) Foreign Application Priority Data

Nov. 20, 2012  (ZA) .................. 2012/08697
Dec. 11, 2012  (ZA) .................. 2012/09351
Mar. 18, 2013  (ZA) .................. 2013/02001
Apr. 30, 2013  (ZA) .................. 2013/03181
Jul. 24, 2013   (ZA) .................. 2013/05599
Aug. 21, 2013  (ZA) .................. 2013/06279

(51) Int. Cl.
E04B 1/344    (2006.01)
E04B 1/343    (2006.01)
E04H 1/12     (2006.01)
(Continued)

(52) U.S. Cl.
CPC .............. *E04B 1/3442* (2013.01); *A01G 9/14* (2013.01); *A01K 3/00* (2013.01); *B65D 88/127* (2013.01); *B65D 88/522* (2013.01); *B65D 90/026* (2013.01); *B65D 90/046* (2013.01); *B65D 90/14* (2013.01); *E04B 1/3444* (2013.01); *E04B 1/34336* (2013.01); *E04B 1/34384* (2013.01); *E04B 1/34352* (2013.01); *E04B 2001/34389* (2013.01); *E04H 2001/1283* (2013.01)

(58) Field of Classification Search
CPC .......... E04B 1/34305; E04B 1/34384; E04B 1/34336; E04B 1/34321; E04B 2001/34389; E04B 5/43; E04B 1/3442; E04H 9/145
See application file for complete search history.

(56) References Cited

U.S. PATENT DOCUMENTS 4,635,412 A * 1/1987 Le Poittevin ......... E04B 1/3442
                                                   280/763.1
4,741,133 A * 5/1988 Kutzner ................ E04B 1/3444
                                                       52/143

(Continued)

FOREIGN PATENT DOCUMENTS

AU      2007 100 989 A4    1/2008
DE      199 62 990 A1      7/2001

(Continued)

OTHER PUBLICATIONS

International Search Report, dated Apr. 4, 2014, from corresponding PCT application.

*Primary Examiner* — Rodney Mintz
(74) *Attorney, Agent, or Firm* — Young & Thompson

(57) ABSTRACT

A structure which includes a container (16) which forms a housing (20) and, mounted to the housing, a plurality of walls (52,54,56,58) which are pivotally interconnected and which are movable between a compact stored configuration and an extended operative configuration.

14 Claims, 11 Drawing Sheets

(51) Int. Cl.
*B65D 90/14* (2006.01)
*B65D 90/04* (2006.01)
*A01G 9/14* (2006.01)
*A01K 3/00* (2006.01)
*B65D 88/12* (2006.01)
*B65D 88/52* (2006.01)
*B65D 90/02* (2006.01)

(56) References Cited

U.S. PATENT DOCUMENTS

| | | | | |
|---|---|---|---|---|
| 5,237,784 | A * | 8/1993 | Ros | B60P 1/6427 52/67 |
| 5,966,956 | A | 10/1999 | Morris et al. | |
| 6,223,479 | B1 * | 5/2001 | Stockli | E04B 1/3442 52/126.1 |
| 7,117,645 | B2 * | 10/2006 | Bzorgi | E04B 1/3442 52/68 |
| 7,874,107 | B1 | 1/2011 | Medley et al. | |
| 7,882,659 | B2 * | 2/2011 | Gyory | E04B 1/3444 296/182.1 |
| 8,201,362 | B2 * | 6/2012 | Alford | E04B 1/3442 52/64 |
| 2005/0160682 | A1 * | 7/2005 | Quadrio | B65D 88/005 52/67 |
| 2006/0185709 | A1 * | 8/2006 | Bzorgi | E04B 1/3442 135/143 |
| 2011/0023925 | A1 * | 2/2011 | Johnson | B60P 3/341 135/139 |
| 2011/0126479 | A1 * | 6/2011 | Alford | E04B 1/3442 52/79.5 |
| 2014/0090312 | A1 * | 4/2014 | Medley | E04B 1/34357 52/79.5 |
| 2014/0144088 | A1 * | 5/2014 | Heger | E04B 1/34357 52/79.5 |
| 2015/0027067 | A1 * | 1/2015 | Finney | E04B 1/34363 52/79.5 |
| 2015/0267396 | A1 * | 9/2015 | Cantin | E04B 1/34305 52/79.5 |
| 2015/0292194 | A1 * | 10/2015 | Calafatis | E04B 1/34305 52/67 |

FOREIGN PATENT DOCUMENTS

| | | | |
|---|---|---|---|
| EP | 2 468 984 A1 | 6/2012 | |
| ZA | WO 2014194341 A2 * | 12/2014 | E04H 3/08 |
| ZA | WO 2015164891 A2 * | 10/2015 | E04B 1/343 |

* cited by examiner

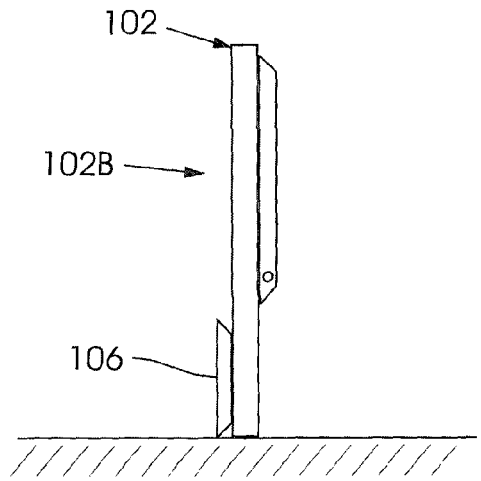
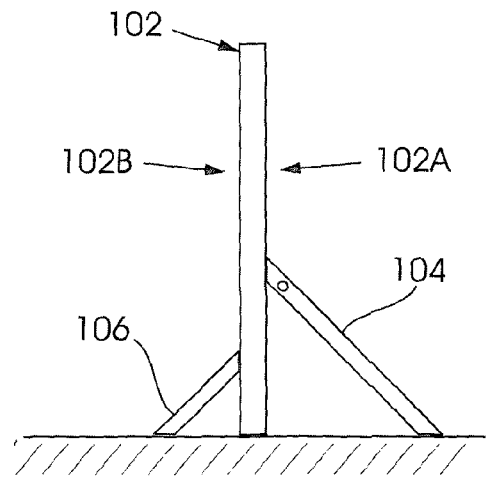
FIGURE 7
FIGURE 8
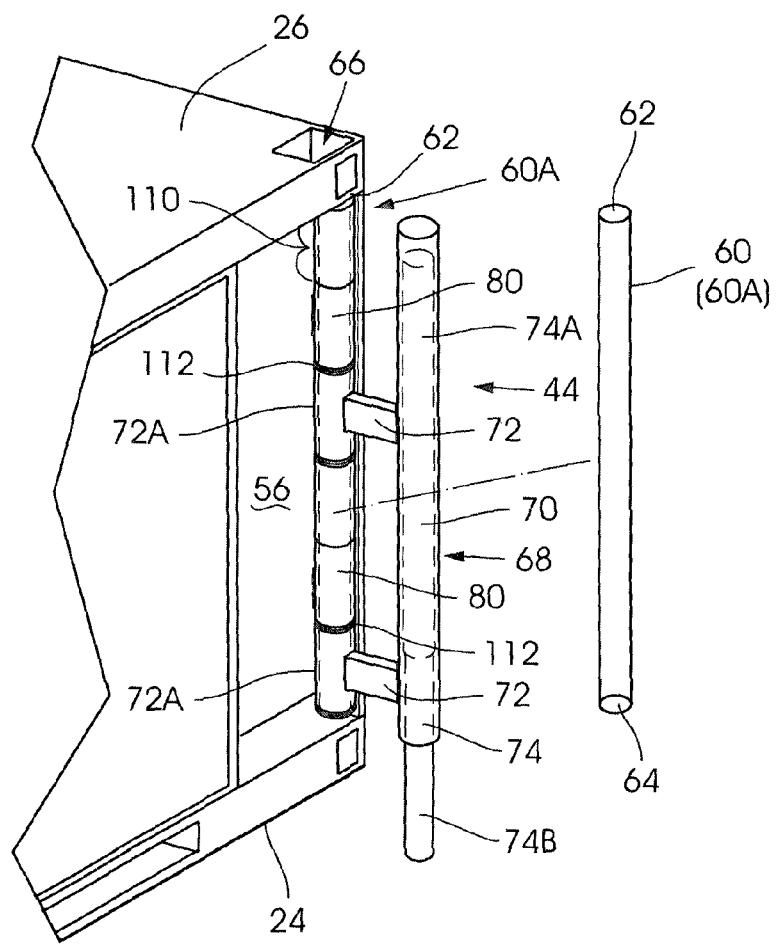
FIGURE 9

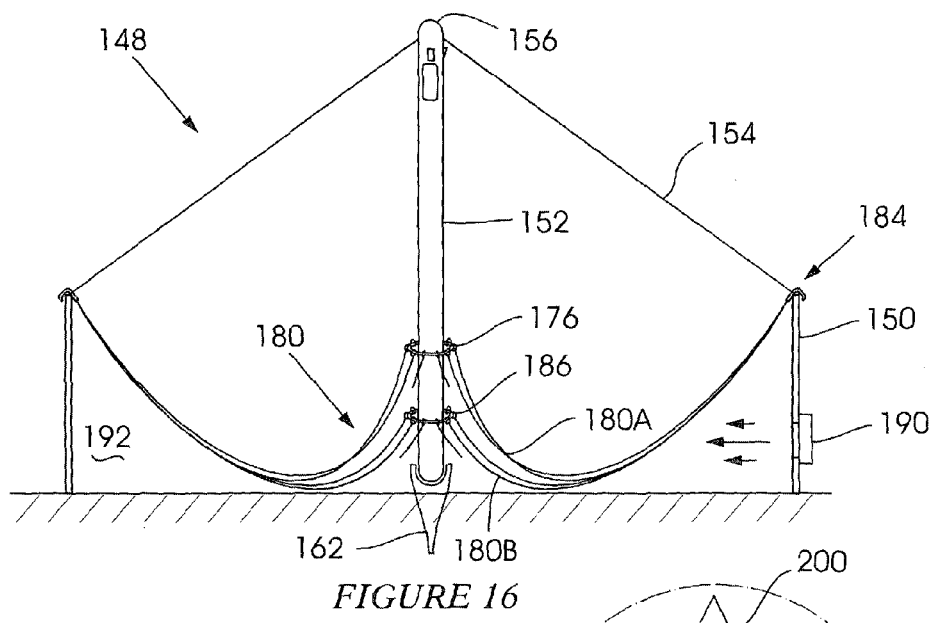
FIGURE 16
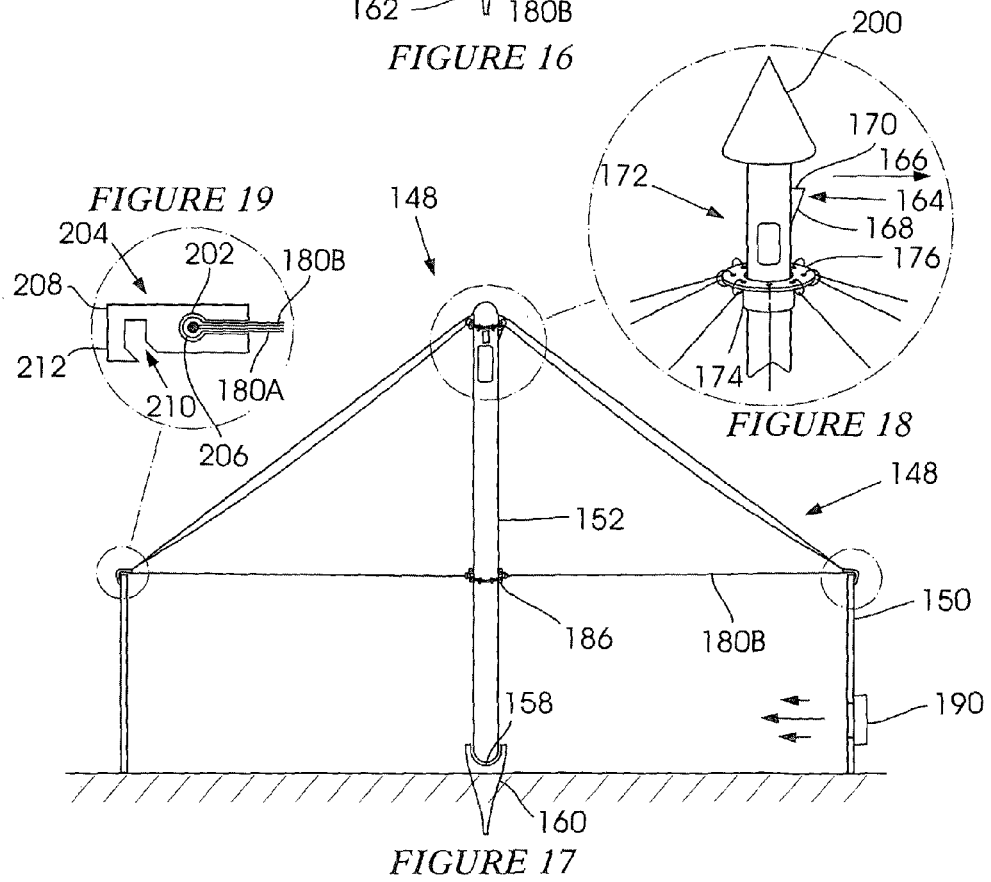
FIGURE 19
FIGURE 18
FIGURE 17

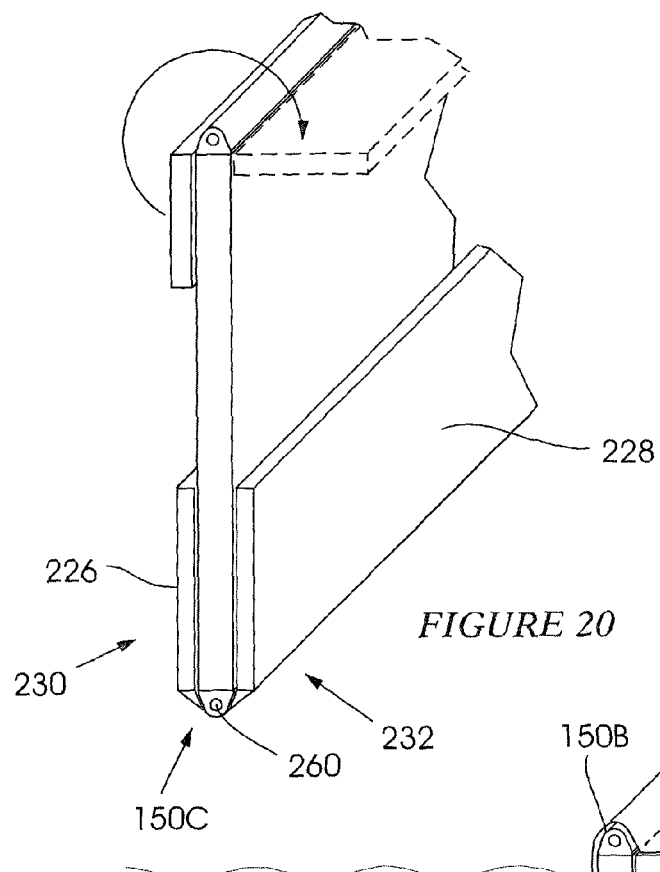
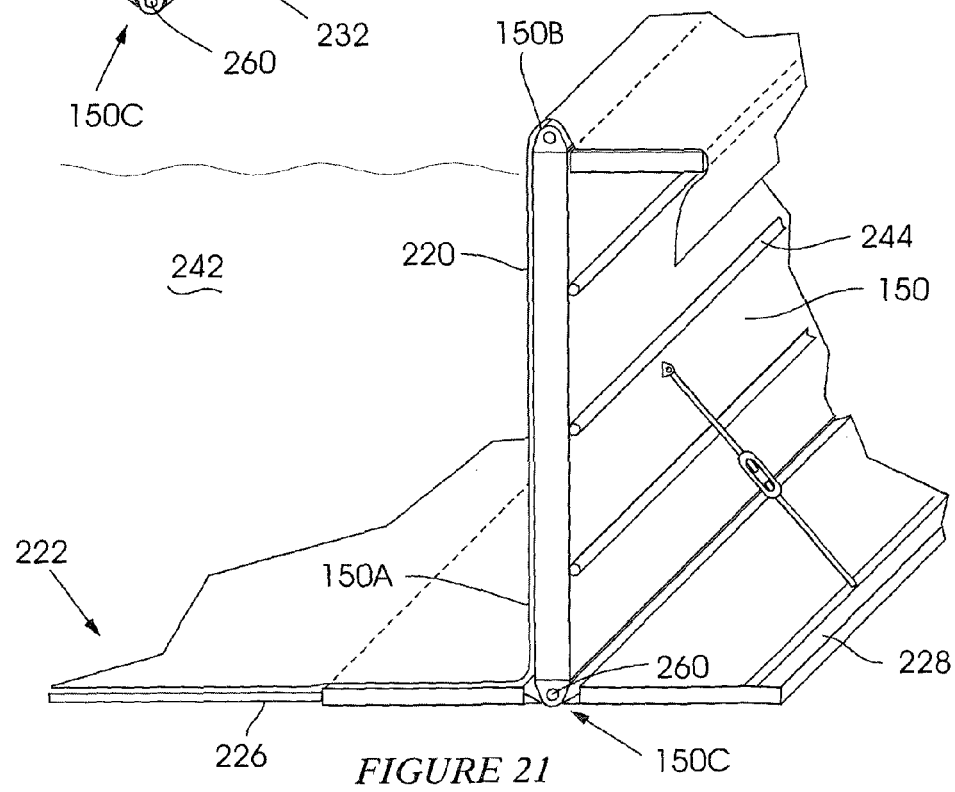

HOUSING STRUCTURE WITH PIVOTALLY MOVABLE WALLS

BACKGROUND OF THE INVENTION

This invention relates to a structure which can be stored and transported in a compact mode and which, at an installation site, can be erected to provide an enclosure, a shelter, a reservoir or the like.

SUMMARY OF THE INVENTION

In a broad sense the invention provides a structure which includes a container which forms a housing and, mounted to the housing, a plurality of walls which are pivotally interconnected and which are movable between a compact stored configuration and an extended operative configuration.

More particularly the invention provides a structure which includes a container which forms a housing of parallelepiped form with a longitudinal axis and with a base, a roof, first and second sides, first and second ends, and first, second, third and fourth corners located respectively at junctions of the first side and first end, first end and second side, second side and second end, and second end and first side, first, second, third and fourth support arrangements located respectively at the first, second, third and fourth corners, each support arrangement respectively including an elongate member with an upper end which is fixed to the roof and a lower end which is fixed to the base, a cylinder, a hinge mechanism which secures the cylinder to the elongate member and which permits the cylinder to be moved between an operative position at which the cylinder is displaced from the corner and a storage position at which the cylinder is retracted to the corner, and a piston, telescopically connected to the cylinder, which is actuable with the cylinder in the operative position to extend downwardly from the cylinder whereby a lower end of the piston is brought into ground-engaging contact and the piston thereby exerts a force which elevates the housing relative to the ground, at least a first wall which is substantially rectangular in outline and which has a lower horizontal edge, an upper horizontal edge, an inner vertical edge and an outer vertical edge, and a first pivotal connection which connects the inner vertical edge to the elongate member at the first corner whereby the first wall is pivotally movable about the elongate member between a storage position at which the first wall is located at the first side and is generally parallel to the longitudinal axis and a deployed position at which the first wall extends transversely to the longitudinal axis.

The structure may include a second wall which is generally rectangular in outline and which has a lower horizontal edge, an upper horizontal edge, a first vertical edge and a second vertical edge, and a second pivotal connection which connects the first vertical edge to the outer vertical edge of the first wall whereby the second wall is pivotally movable about the second pivotal connection relative to the first wall between a first position at which the second wall is generally adjacent the first wall and a second position at which the second wall extends transversely to the first wall.

The structure of the invention may be employed, as indicated, in various ways, for example to provide an enclosure, a shelter, a reservoir or the like. Two or more of the structures may be employed in combination and the respective walls of the structures may be interconnected in any appropriate way to enclose a defined area.

The structure of the invention may include third and fourth walls which are secured via a respective support arrangement and a pivotal connection, similar to what has been described, to the fourth corner i.e. on the same side of the container as the first and second walls. Also, if required, additional similar walls can be provided on the second side.

If the structure is to be used to provide a shelter then, preferably, the first wall and the second wall are used to form at least part of an enclosure which bounds a ground area and the structure may then include a roof component which is formed from sheet material which is fixed, at least, to the upper horizontal edges of the first and second walls and which overlies, and which is spaced from, the ground area. Use may additionally be made of a mast or similar support structure to keep the sheet material at an elevated position.

One or more floor elements or panels, e.g. in the nature of rigid sheet material, may be fixed to the walls and may be deployed e.g. by pivotal action into ground-engaging contact in order to overlie and be supported by the ground area.

When the walls are moved between storage and deployed positions use may be made of level sensors to ensure that each wall is correctly orientated relative to the ground.

An important benefit of the invention is that the respective elongate member, provided at each corner of the housing, is fixed between the roof and base in a load-transferring manner. These members are sized so that they can transfer significant loads—a feature which enables containers of a number of similar structures to be stacked one on the other for transport or storage purposes.

The long sides of a conventional shipping container add substantial rigidity to the container particularly between a floor and a roof of the container. In one form of the present invention the material normally used on a side of a shipping container is replaced by the walls referred to. Consequently when that material is removed, the roof, in particular, is not well-supported. The roof can therefore be flimsy and if the container is moved the container can deform. According to one aspect of the invention when the first wall is moved to the storage position referred to it is designed to re-engage, directly or indirectly, with the base and the roof and to provide support for these components so that the container is both firm and rigid enough to be moved, lifted and transported, without fear of deformation.

When the structure is to be used as a reservoir, substantial pressure may be generated by a liquid at a base of each wall. This pressure can distort the wall. To rigidify the wall different bracing mechanisms are employed. One technique makes use of a flap on an inner side, and a flap on an outer side, of the wall, at the base thereof. Each flap is pivoted down to rest on the ground when the wall is erected. Thereafter a fluid-impervious liner is placed over the inner flap, abutting an adjacent wall surface, to form a liquid enclosure. The wall can nonetheless distort due to the force of the liquid. If a solid hinge connection is used between each flap and the wall then the hinge connection could be bent by the force. To address this aspect a steel cable is employed as a hinge pin. The cable bends under load but, when the liquid is emptied from the enclosure, the cable can take up its original shape. Also, to a substantial extent, through appropriate design, the wall and the flaps are not adversely affected and do not bend materially.

Cables or other retention members can be anchored directly or indirectly to lower edges of the walls e.g. via the inner flaps referred to, spanning an area enclosed by the walls in order to brace the walls against liquid forces.

Flexible sheet material can be connected to the walls to make a roof. Preferably this material has a bead along its periphery which is positioned in a shaped, undercut channel retention device. The retention device is effectively permanently attached to the sheet material via the bead. When the roof is erected each retention device is hooked or otherwise easily attached to an upper edge of a wall—in this way a roof can be erected rapidly.

It is possible that the structure will be erected on terrain which is not level and that lower ends of the walls will then not always directly contact the ground. To address this aspect adjustable supports are used. Also, closure members can be used to obscure gaps between the lower horizontal edge of a wall and an opposing ground surface. Each closure member may be attached in a hinged manner to a lower region of a wall. Apart therefrom the closures can be used to brace the walls, particularly if a reservoir is to be made.

In making a shelter, boundary walls may be interconnected by means of partitioning to provide smaller rooms or enclosures inside the boundary walls. Reticulation for communications and electrical and other services may be provided within or on the walls.

Each wall may be made from inner and outer skins with bracing components between. This type of construction is rigid yet light in weight.

The use of the structure of the invention is not limited for it may be adapted to be used as a centre to house electrical equipment, for housing of personnel, to act as a hospital theatre, for food storage or kitchen purposes, or the like. Another application is to attach to the walls a roof of a transparent material so that an underlying volume can be used as a greenhouse. The walls may then also be wholly or partly transparent.

BRIEF DESCRIPTION OF THE DRAWINGS

The invention is further described by way of examples with reference to the accompanying drawings in which:

FIG. 7 is a schematic cross-sectional side view of a wall used to define part of the enclosure of FIG. 5, in the process of erection, FIG. 8 is similar to FIG. 7 but showing the wall in cross-section once erected, FIG. 9 depicts detail of a support arrangement—a substantially similar support arrangement is located at each respective corner of the container, FIGS. 16 to 19 illustrate aspects relating to the erection of a roof on the structure, and FIGS. 20 to 22 show support techniques which can be used when the structure is employed in the construction of a reservoir.

DESCRIPTION OF PREFERRED EMBODIMENTS

Figure 1:
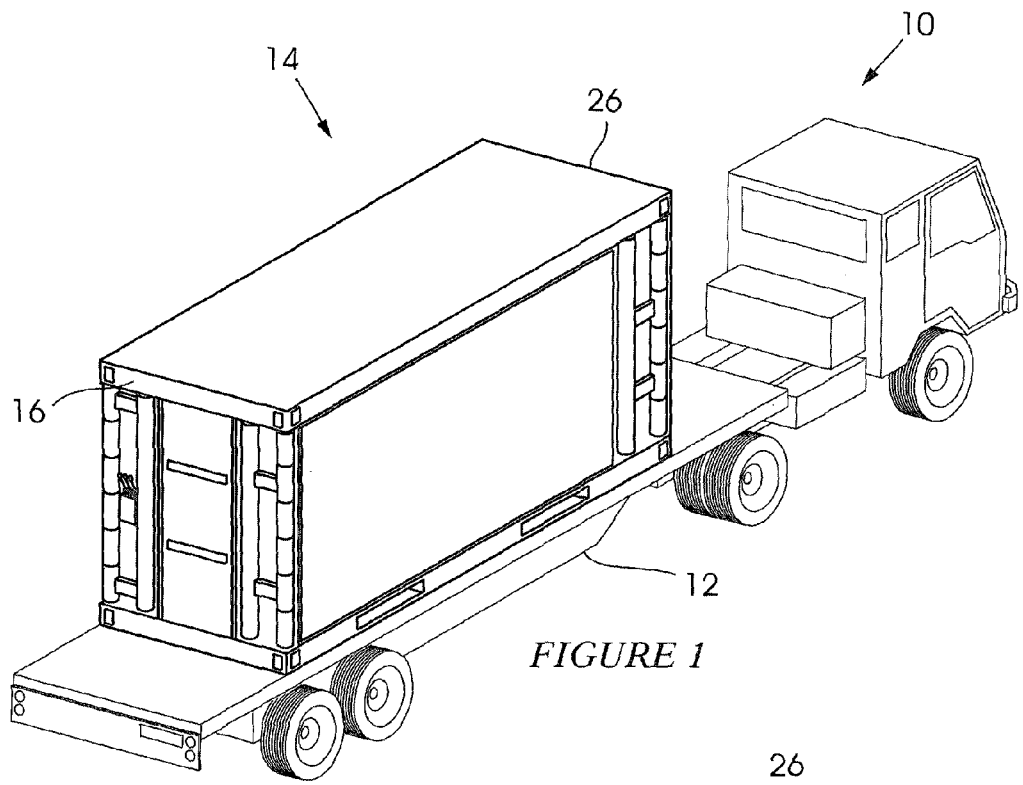
FIG. 1 is a perspective view of a truck which carries a container used for making a structure according to the invention.

FIG. 1 of the accompanying drawings illustrates a mechanical horse 10 with a low-bed trailer 12 which carries a structure 14 according to the invention. The structure is based on the use of a container 16 which is substantially the same as a conventional shipping container.

The container 16 comprises a housing 20 of parallelepiped form. The container has a longitudinal axis 22, a base 24, a roof 26, first and second sides 28 and 30 respectively, first and second ends 32 and 34 respectively, and first, second, third and fourth corners 36 to 42 respectively—see FIGS. 2, 3 and 4 as well. The corners are respectively located at junctions of the first side and first end, first end and second side, second side and second end, and second end and first side.

At each corner a respective support arrangement 44 to 50 is positioned.

Figure 3:
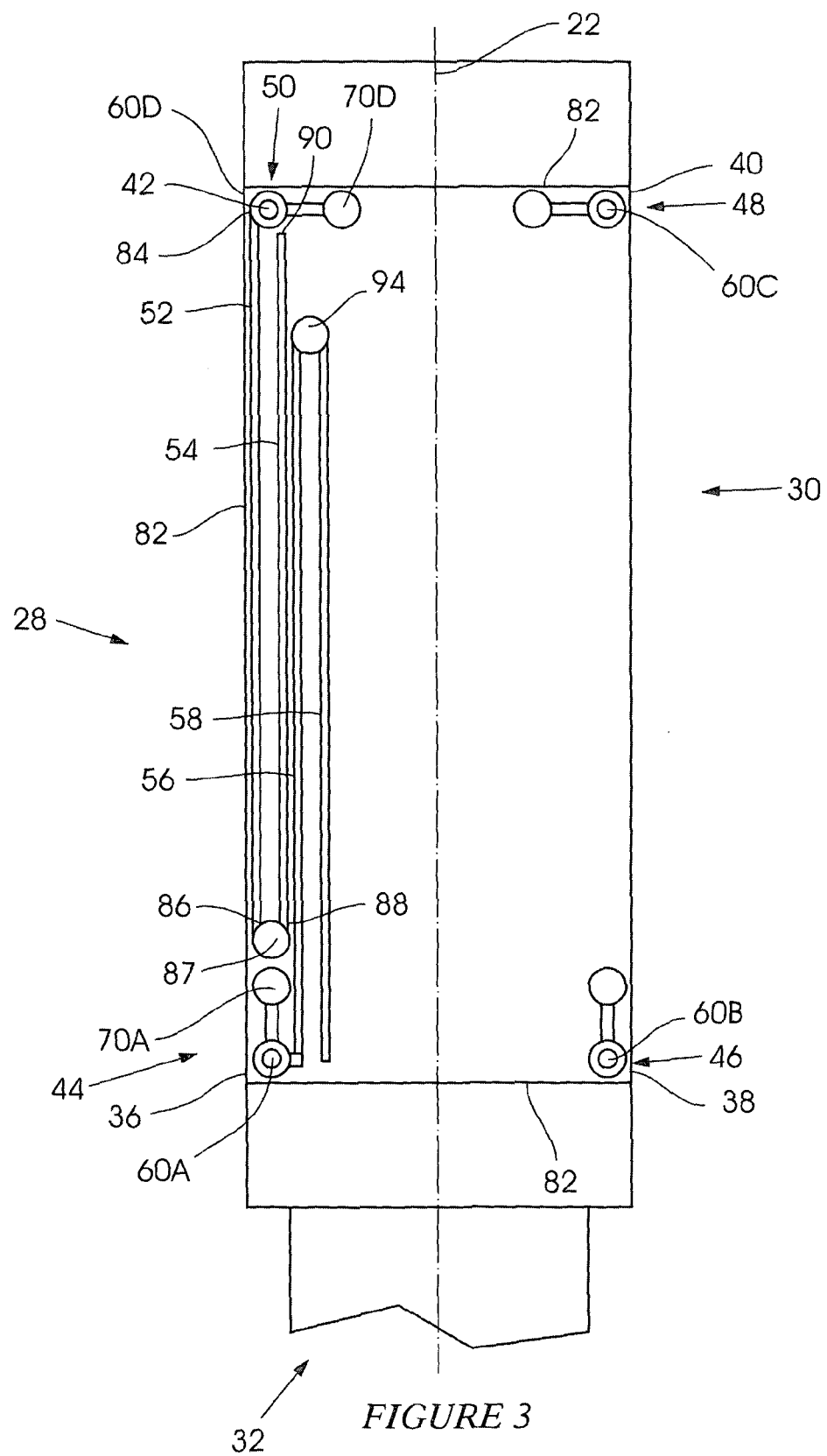
FIG. 3 is a simplified plan view of the truck and structure in FIG. 1 illustrating the arrangement of certain components inside the container

Referring to the simplified view shown in plan in FIG. 3 the structure includes, adjacent the first side 28, first and second walls 52 and 54 respectively and third and fourth walls 56 and 58 respectively. Each wall is rectangular in outline with opposed lower and upper horizontal edges, and opposed vertical edges.

FIG. 9 is an enlarged perspective view illustrating the support arrangement 44. In general terms these support arrangements are identical to one another although minor differences are made to facilitate implementation of the principles of the invention.

Each support arrangement includes a respective elongate support member 60 of substantial dimensions. The support member has an upper end 62 which is fixed to the roof 26 and a lower end 64 which is fixed to the base or floor 24 of the container. A conventional shipping container has securing lugs or lock blocks 66 at each of its corners. These are important structural components for they allow the container to be fixed in position on a truck—an aspect which is essential for safe transport of the container. Additionally these lock blocks act as load-bearing and load-transferring elements which allow a number of containers to be stacked one on the other. Again this is an important aspect given the fact that a container, when fully loaded, can have a mass of many tons.

If a conventional shipping container is to be modified to make up the container of the invention (in one embodiment) the resulting container would not include at least one conventional side structure i.e. where the walls 52 to 58 are positioned and the container, along this side, would be significantly weakened. It is important therefore that provision should be made to impart rigidity and load-bearing characteristics to the container. The support arrangements are designed to achieve, at least, this purpose. The elongate member 60 has a substantial load-bearing capability and is positioned, as noted, with opposed ends abutting the upper and lower load-bearing lock blocks 66 at the respective corner of the container. Secondly, the elongate member is made in the form of a circular shaft so that it can act as a hinge pin for a cylinder and piston arrangement 68, and as a hinge pin to the particular wall which is directly connected to it.

Figure 2:
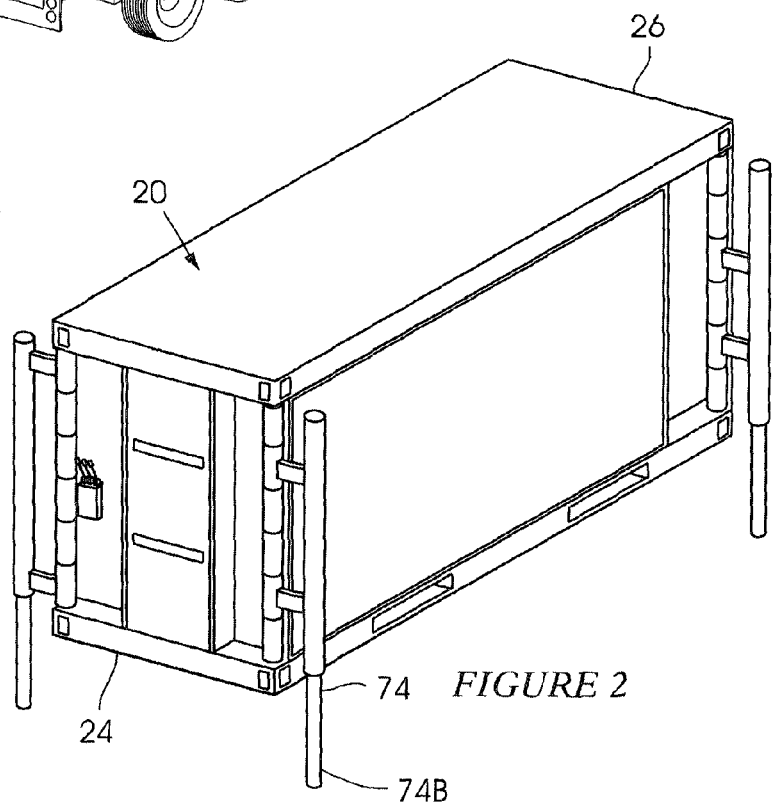
FIG. 2 shows the container of FIG. 1 detached from the truck.

The cylinder and piston arrangement 68 is mounted in a tube 70. A number of steel leaves 72 extend from the tube to the elongate member. These leaves are pivotally connected to the elongate member by respective bushes 72A and are rotatable to a limited extent around the elongate member 60 which acts as a hinge pin. The cylinder and piston arrangement 68, mounted inside the tube 70, is in the nature of a ram comprising a piston 74 which extends from a cylinder 74A and which is actuable hydraulically so that a lower end 74B of the piston can extend downwardly into ground-engaging contact, as is shown in FIG. 2. Each wall has a number of bushes 80 which are connected in a rotatable manner to the elongate member.

FIG. 3 shows the container in plan. The elongate members at the corners of the container are designated, respectively, 60A, 60B, 60C and 60D. Each elongate member is within the confines of a boundary line 82 formed by outer sides and ends of the container, viewed in plan. Thus, the structure of the invention (in a storage mode) does not extend outside the normal dimensional boundaries of a conventional shipping container.

The wall 56 is connected to the elongate member 60A by means of hinge bushes 80, as shown in FIG. 9. The wall 52 is connected to the elongate member 60D—this is along what is referred to as an inner vertical edge 84 of the wall. At an opposed, or outer, vertical edge 86, the wall 52 is connected to a pivotal arrangement 87. The second wall 54 has a first vertical edge 88 which is connected to the pivotal arrangement 87 and an opposed second vertical edge 90 which is anchored in position so that, in the storage mode shown in plan in FIG. 3, the wall 54 is adjacent and substantially parallel to the wall 52 and to the longitudinal axis 22 of the container.

Figure 4:
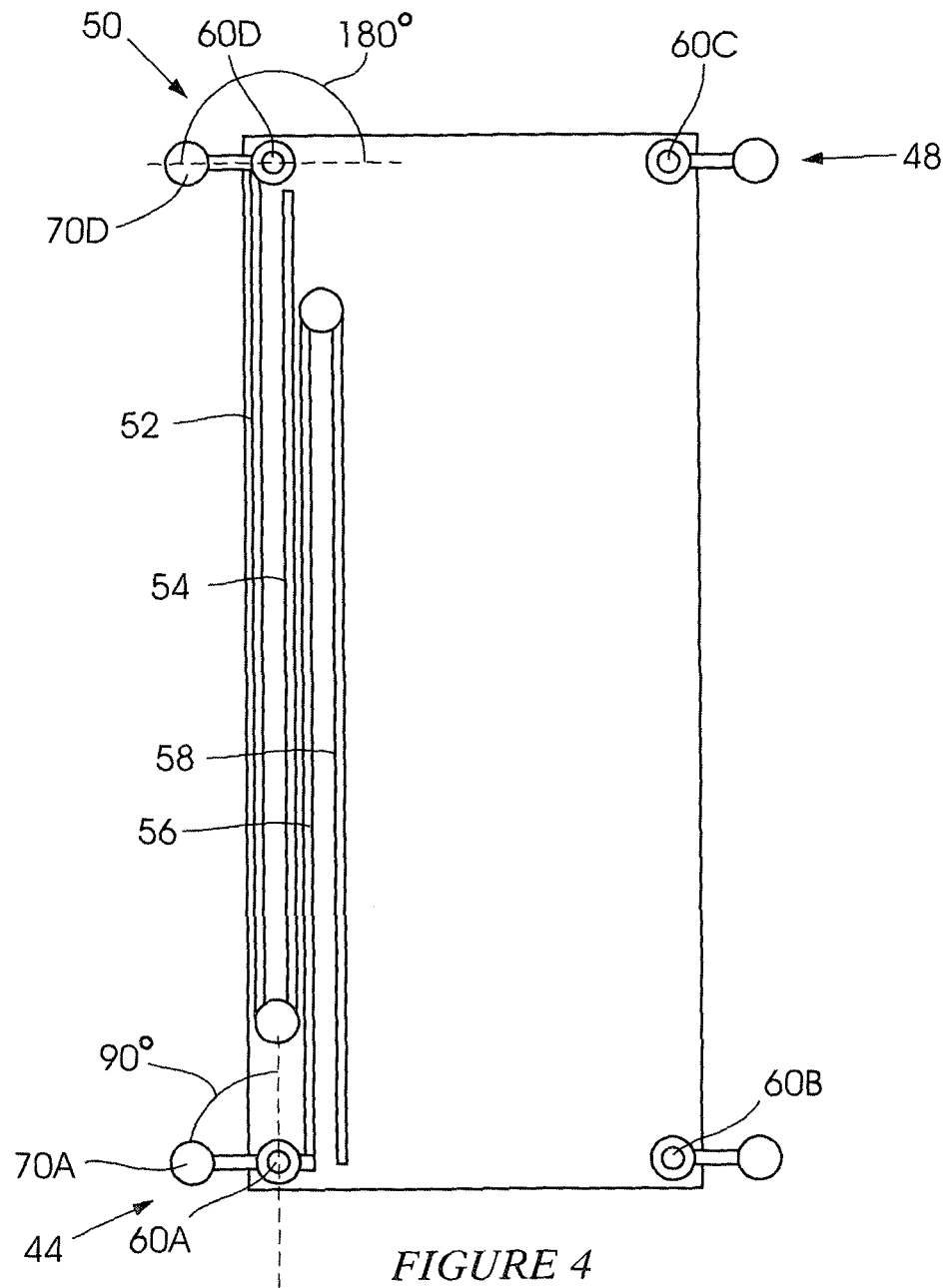
FIG. 4 is similar to FIG. 3 illustrating how support arrangements in the container are deployed.

The leaves 72 which connect the tube 70 to the respective elongate member have a radial dimension which enables the tube to be moved from the storage position shown in FIG. 3 to an operative position shown in FIG. 4. In the storage position the tube is within the dimensional boundaries (82) of the container, viewed in plan. This means that each tube does not interfere with movement, transport and storage of the container. However, when necessary, the tube can be swung to the operative position shown in FIG. 4 at which the tube is displaced to be outside the dimensional boundary (82) of the container. At this position the respective ram inside the tube can be actuated so that the lower end 74B of the piston inside the tube 70 can be extended downwardly into ground-engaging contact as shown in FIG. 2.

The wall 52 is on an "outer" side of the corresponding elongate member 60D. This allows the walls 52 and 54 to be positioned close to the side 28. The wall 56 is however on what may be referred to as an "inner" side of the corresponding elongate member 60A, i.e. it is displaced laterally to one side. This construction allows the walls 56 and 58, which are interconnected by a pivot arrangement 94, to be positioned close to, yet adjacent and not interfering in any way with, the walls 52 and 54.

At the elongate member 60A, the corresponding tube 70A is shown in FIG. 3 in a storage position i.e. more or less aligned with the walls 52 and 54. When the tube is moved to an operative position as shown in FIG. 4 the tube is moved through about 90° so that it extends radially from the elongate member—note that the opposing tube 70D moves through approximately 180° when it is moved between operative and storage positions.

An important aspect of the invention thus lies in the provision of an elongate member (60), at each respective corner of the container, which serves a number of functions. The elongate member acts as a hinge pin for the support arrangement at the corner and as a hinge pin for the respective wall which is attached directly to it. Also the elongate member has sufficient strength so that it can act as a load-transferring member between the roof and base of the container. This last-mentioned feature means that a number of structures, each of which embodies a container of the kind described, can be stacked one above the other for storage or transport purposes.

When the structure is to be deployed the support arrangements 44 to 50 are moved so that they are spaced sufficiently far apart, as shown in FIG. 4, so that each respective piston can be extended, hydraulically, into ground-engaging contact. The housing of the container can then be elevated and the low bed trailer, shown in FIG. 1, can be driven away. Thereafter the container can be lowered to rest on the ground. Conversely, when the container is to be removed from a particular site the support arrangements 44 to 50 are extended and the low bed trailer is then manoeuvred so that it underlies the container. As the support arrangements are retracted the container housing settles onto the low bed trailer. This arrangement obviates the need for a crane at an installation site, to lift the container off a low bed trailer and subsequently to place the container onto a low bed trailer.

Figure 5:
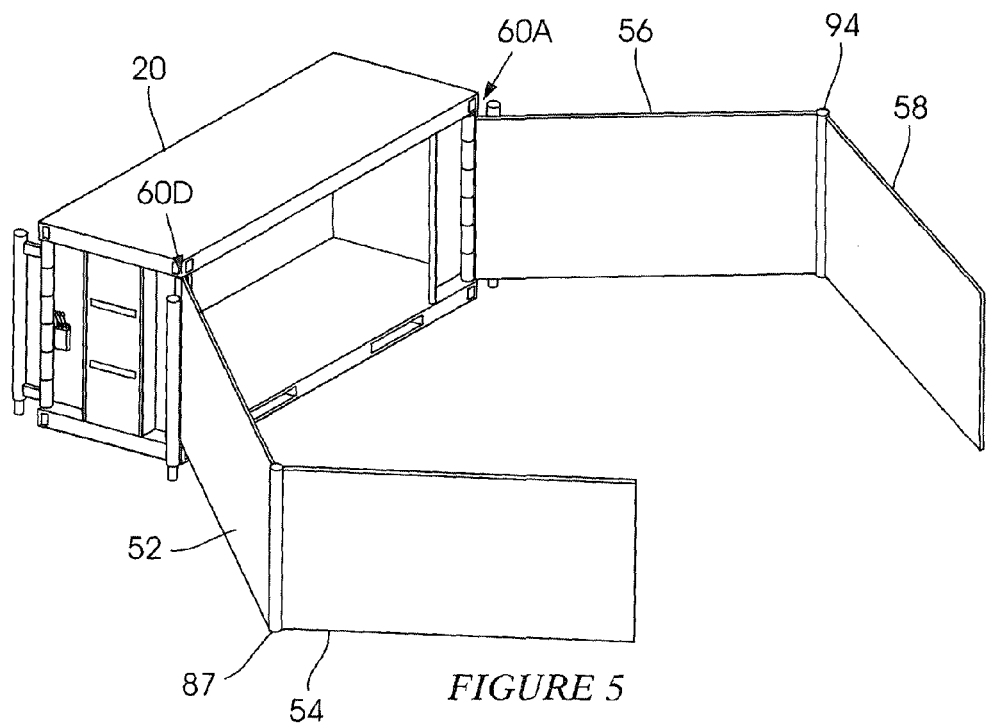
FIG. 5 is a perspective view showing how walls can be extended from the container in FIG. 2.

FIG. 5 illustrates in perspective the housing 20 once it has been placed on the ground and the support arrangements 44 to 50 have been retracted. The walls 52 and 54 are respectively pivoted about the elongate member 60D and the pivot connection 87 into positions at which they extend outwardly from the housing and at which the walls are no longer parallel to one another. Similarly the walls 56 and 58 are deployed to radially extending positions. In this arrangement there are four walls on one side of the container. This is illustrative only and non-limiting. For example, an opposing side of the container, viewed in plan, could have, in a similar way, four walls which are radially deployed in opposing directions to what are shown in FIG. 5.

Another possibility is that at one corner of the container two walls could be provided and at an opposing corner a third wall. These walls could then be arranged in a triangular closed configuration.

With the arrangement in FIG. 5 the four walls could be brought together to form a five-sided enclosure i.e. with four sides formed by the walls and a fifth side formed by the housing 20 itself. If multiple containers are used each container could be deployed generally in the manner shown in FIG. 5 to achieve different polygonal structures. The invention is thus not limited by the number of sides in a structure which can be erected.

Figure 6:
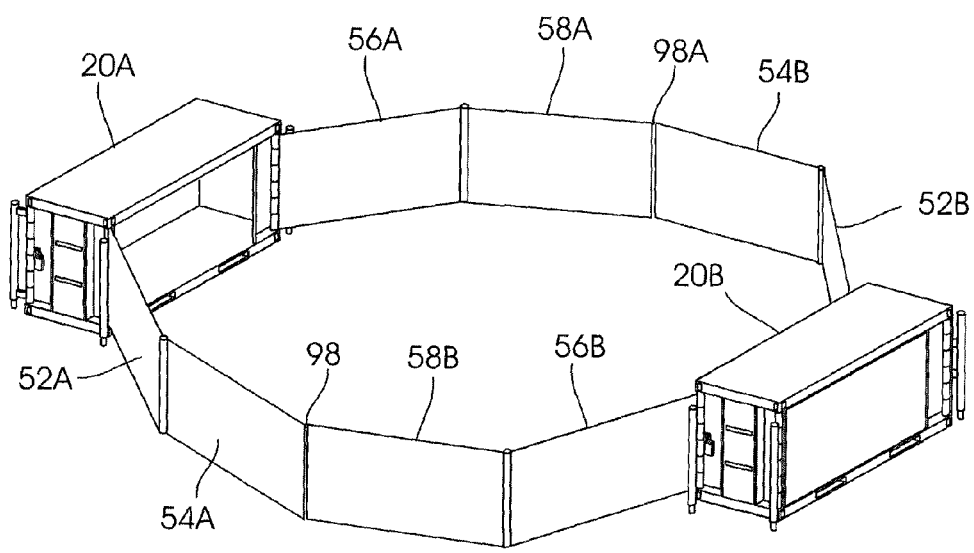
FIG. 6 shows in perspective an enclosure formed from two containers each of which is used substantially in the manner shown in FIG. 5.

FIG. 6 illustrates a situation in which two housings designated 20A and 20B respectively are positioned opposing each other. Four walls are extended from each housing. Extremities 98 and 98A of the extending sets of walls are connected to each other to form a ten-sided enclosure 100.

FIG. 7 shows a typical wall 102 from one side and in cross-section. The wall carries a first strut 104 in a hinged arrangement which can be pivoted downwardly from the position shown in FIG. 7, to a ground-engaging and bracing position shown in FIG. 8. The strut is located on an outer side 102A of the wall 102. On an inner side 102B close to a lower end of the wall a small flap 106 is positioned. When the wall is deployed the flap is pivoted downwardly and away from the lower end of the wall into the ground-engaging position shown in FIG. 8. The strut braces the wall against forces which are directed outwardly i.e. from an inner side towards the outer side.

The flap 106 is one of a number of similar flaps some of which are optionally made from rubber or smooth sheet metal, for example. The flaps extend along the length of the wall so that the flaps can generally follow the contours of the ground on which the wall is located. The wall may not be generally level or flat and the flaps can thus to a substantial extent close gaps which might otherwise exist between a lower end of the wall and the opposing ground surface.

Figure 10:
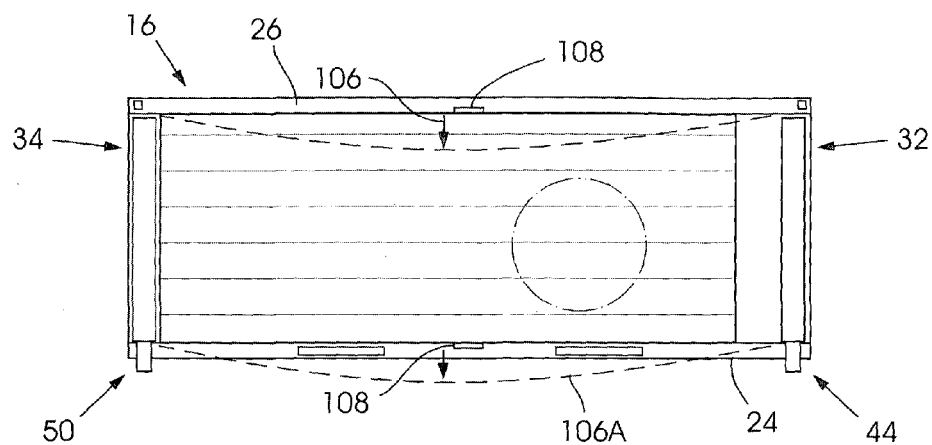
FIG. 10 is a side view of a container.

As noted, a conventional shipping container has substantial rigidity. If that type of container is adapted to be used as a container for making a structure according to the present invention, then the wall structure on one side of the container is removed. FIG. 10 illustrates from one side a container 16 according to the invention which includes support arrangements 44 to 50 as described. The wall 52 extends from the end 34 to the end 32 over practically the full length of the container. This wall obscures the inner walls 54, 56 and 58. The wall 52 is supported, in this instance, at the left end. If the wall is moved away from between the roof 26 and the base 24 then, due to the mass of the structure, the roof and the base can sag down, as shown by arrows 106 and 106A. This aspect can be addressed, in use, by providing a custom-designed brace or braces between the base and the roof. These braces can be positioned at a number of locations as appropriate. Another possibility, in addition to or in place of the aforegoing, is to brace the roof and the base by using guidance brace structure 108, notionally indicated only in FIG. 10, at a number of locations along the lower and upper horizontal edges of the wall 52 or on the roof and floor, or on all three components. When the wall is pivoted to the storage position shown in FIG. 3 the structures 108 are between the wall and the base on the one hand, and between the wall and the roof on the other hand. This positive interaction or engagement of the wall with the base and roof helps to rigidify and stabilise the container, an aspect which is important, particularly if the container is to be transported.

Another feature of the invention is disclosed in FIG. 9. FIG. 9 shows that the bushes 80 which connect the wall 56 to the elongate member 60A are positioned on the elongate member 60A above the bushes 72A which connect the support arrangement 68 to the elongate member 60A. In fact there is a substantial amount of play 110, as high as 150 mm, between these components. Thrust washers 112 are provided between opposing surfaces of adjacent bushes 80 and 72A. In practice when the support arrangement is actuated the bushes 72A move along the elongate member 60A and then firmly contact the respective thrust washers 112 which are driven into tight engagement with undersides of the respective bushes 80. The force which is transmitted lifts the walls 56 and 58 along the elongate member 60A until upper sides of the walls nearly contact an underside of the roof. The full weight of the wall is thereby transferred to the support arrangement and is not carried by the remainder of the container. This allows the walls 56 and 58 to be disengaged from the base 24 and the roof 26. The walls can be disengaged from the braces 108 shown in FIG. 10 and can be swung out, as necessary, to deployed positions e.g. as shown in FIG. 5.

Figure 11:
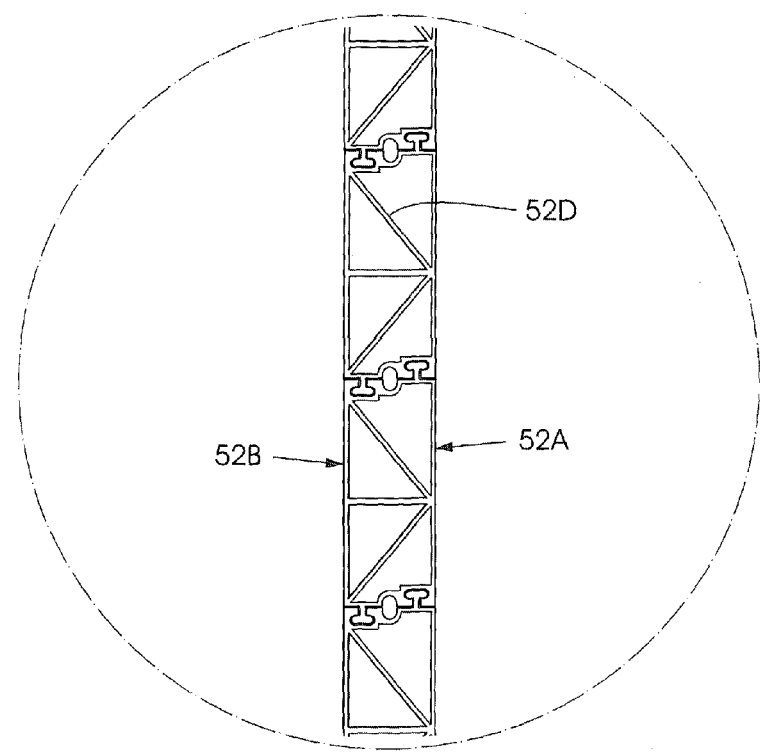
FIG. 11 depicts in cross-section a possible construction of a wall which is used in the structure of the invention.

The container should be made from a lightweight material such as aluminium. Those portions of the container which are required to exhibit significant load-bearing characteristics i.e. the support arrangements and the elongate members are however made from appropriate steel. In order for the walls, which have substantial longitudinal dimensions, to be rigid yet lightweight, use is preferably made of a double skin structure of the kind shown in FIG. 11. This Figure illustrates part of the wall 52 in cross-section. The wall has an outer skin 52A, an inner skin 52B and a number of bracing components 52D which are strategically positioned between the inner and outer skins and which are designed to space the skins apart so that a beam-type arrangement results.

When a wall is moved it may be difficult, particularly due to the size of the wall and the terrain on which the container is used, to ascertain whether the wall is correctly orientated. To overcome this aspect level sensors are attached to the wall to provide an indication of whether each wall is horizontally true and vertically positioned, during and after deployment.

Figure 12:
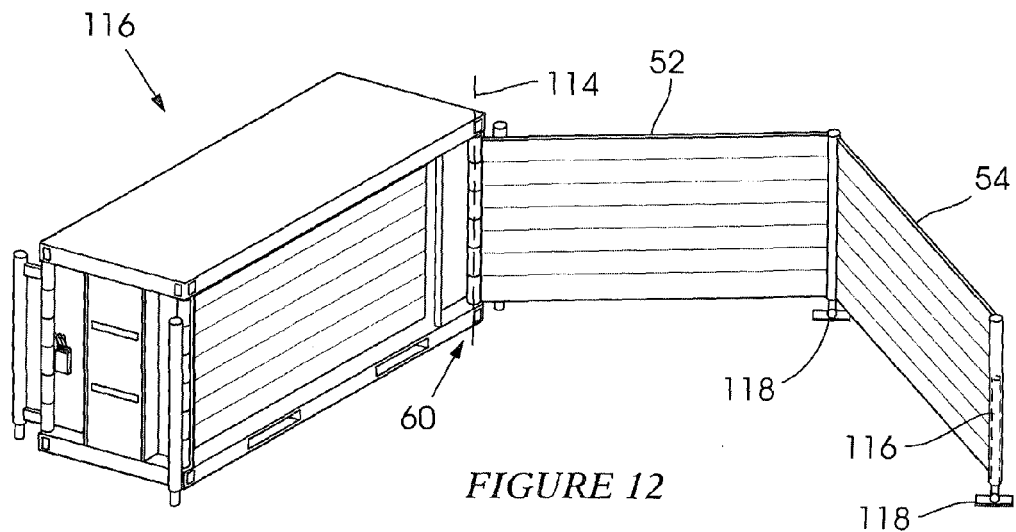
FIGS. 12 and 13 depict support techniques for walls, of the structure, while being moved.

FIG. 12 shows two walls 52, 54 at a corner of the container 16. At an installation site the two walls are initially pivoted jointly outwardly about a vertical axis 114 which coincides with the longitudinal axis of the respective elongate support member 60, at that corner. The walls have substantial dimensions and a reasonable weight and, to assist in this regard, hydraulic cylinders 116 are actuated to bring wheels 118 into ground-engaging contact. The wheels provide a means which supports the walls as they are moved to their desired positions.

The cylinders 116 are controlled, as necessary, using level sensors to provide input signals and, in this way, the walls are correctly orientated, i.e. extending horizontally and vertically, once they are at an installation position.

Figure 13:
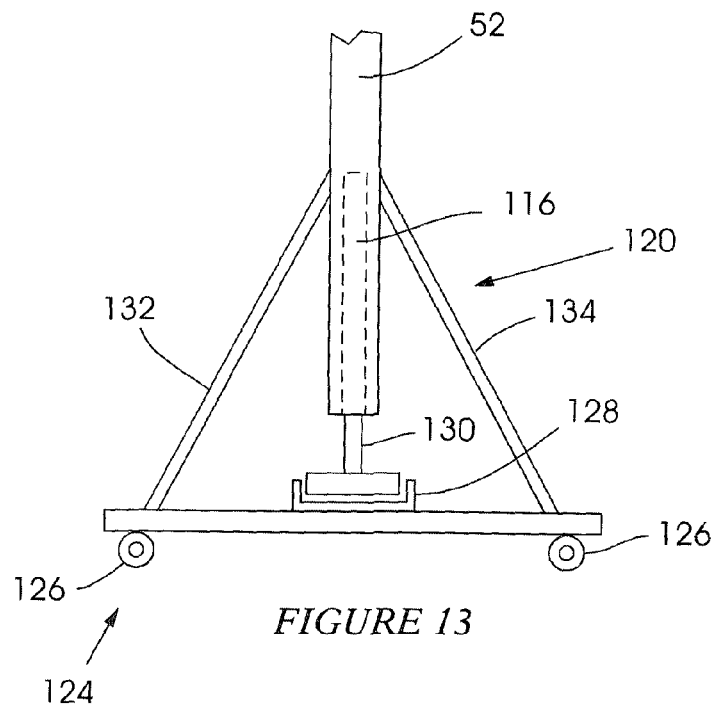

FIG. 13 illustrates a different type of support 120 which can be used when the wall 52 is to be pivoted relative to the container. A small trolley 124 which has spaced sets of wheels 126 has a locating formation 128 on an upper surface. When a piston rod 130 is extended a lower end of the rod is engaged with the locating formation 128. Subsequently two stabilisers 132, 134 which may be either rods or cables are connected between respective ends of the trolley and the wall 52. This arrangement is capable of taking the load of the wall and additionally helps to restrict flexing of the wall 52 as it is being moved.

Figure 14:
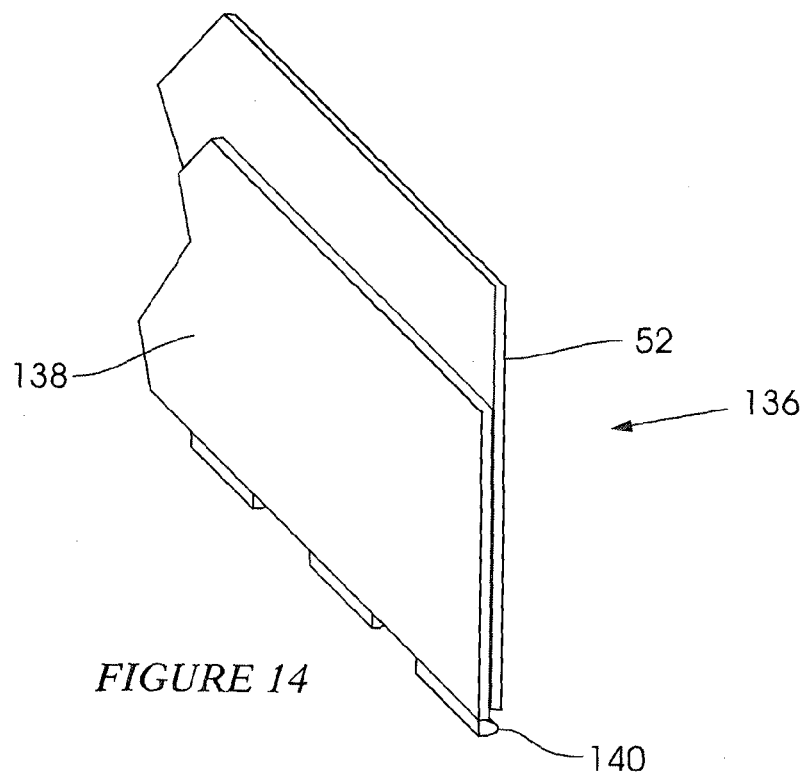
FIGS. 14 and 15 depict a wall which is constructed with an attached floor section or panel.
Figure 15:
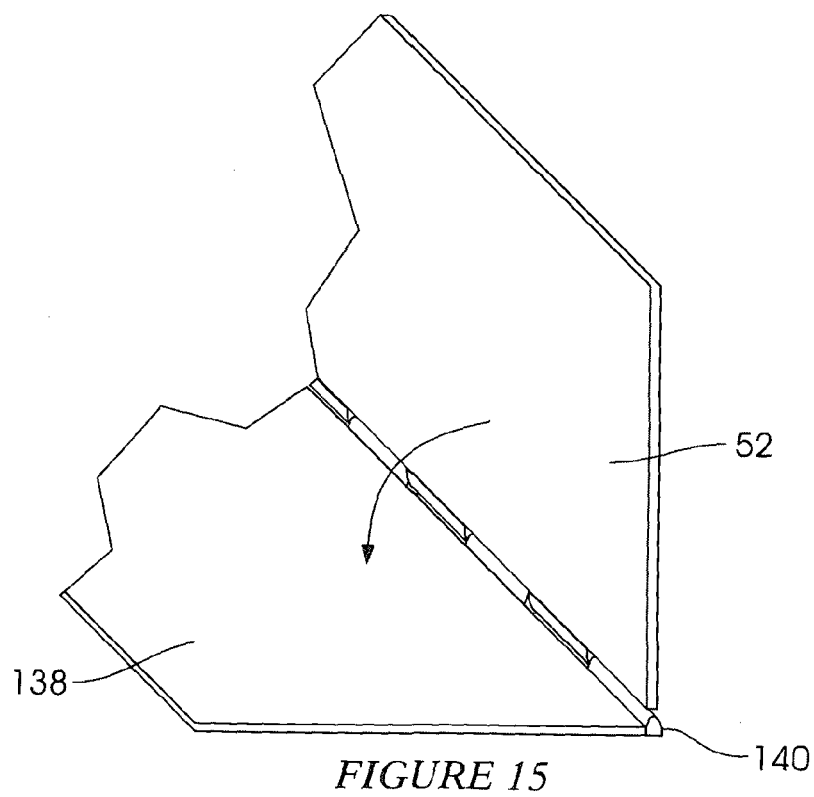

FIGS. 14 and 15 show a floor structure 136 which can be used to cover an area of ground which is enclosed by a number of walls. The floor structure includes a floor panel 138 which is attached at a longitudinal edge to a respective wall 52 by means of an appropriate hinge 140. At an installation site the floor panel is folded into ground-engaging contact—see FIG. 15. A number of these structures are used for complete ground coverage.

FIGS. 16 to 19 show aspects of a shelter 148 made from the structure of the invention. A plurality of walls 150 are erected to form an enclosure on the ground. A mast 152, which is tubular, is held in a vertical orientation by means of a number of stay wires 154. The mast is centrally positioned within the enclosure formed by the walls. The mast has an upper end 156 and terminates at a lower end in a hemispherical formation 158 which is positioned inside a large, upwardly facing, dish-shaped formation 160 which is at an upper end of a peg 162 which is embedded in the ground.

A catch 164 is fixed to the mast near an upper end. The catch is spring-loaded so that it is biased outwardly, away from the mast in the direction of an arrow 166. The catch has a downwardly facing inclined surface 168 and a transverse, flat upper surface 170. A flexible lead (not shown), extends inside the mast from the catch to a lever which is near ground level.

A locating member 172, see FIG. 18, is slidably engaged with the mast. The locating member has a sleeve 174 which bears closely yet slidably against an outer surface of the mast and which thus acts to some extent as a seal. A disc 176 is attached to the sleeve. The disc includes a number of holes or equivalent anchor formations.

Flexible sheet material 180 is fixed to the disc and surrounds the mast 152. The sheet material has a periphery 184 which is attached more or less in a leak-proof manner to upper edges of the walls. The sheet material comprises at least two layers of material namely, a relatively large area, upper layer 180A, and a smaller area, lower layer 180B. The upper layer is fixed to the disc. The lower layer 180B is fixed to a ring 186 which is below the locating member and which is connected to the locating member by means of cables (not shown).

An air blower or fan 190 optionally forms part of the system. The blower may be fixed to one of the walls 150, if required.

When the blower is actuated it introduces air under pressure into a volume 192 below the sheet material. The air in this volume is contained to a substantial extent and thereby is pressurised, forcing the sheet material to move upwardly. Air can pass through the lower layer 180B but not through the upper layer 180A which thus rises with its movement being guided by the locating mast 152. When the member 172 strikes the catch 164 it rides over the inclined surface 168. The catch is moved inwardly against the biasing action of the spring which is attached to it. The locating member 172, at an uppermost position, comes to rest on the relatively flat surface 170 of the catch. The layer 180A is then suspended from the locating member substantially in the form of a tent and forms a roof over the area enclosed by the walls. The lower layer 180B is also elevated by means of the cables to a position at which the lower layer 180B acts as a ceiling over the enclosed area.

To the extent which may be necessary air can flow into an interior of the tubular mast or out of the mast through various apertures which are formed through a wall of the mast.

FIG. 18 also illustrates a cover 200 which fits over an upper end of the mast for aesthetic and weather proofing purposes.

When the flexible sheet material is to be lowered the catch 164 is operated by a cable. The catch is then drawn inwardly and disengages from the locating member 172. The sheet material 180 then settles downwardly under gravity action and air is expelled, as required, through the various apertures upwardly through an interior of the mast to atmosphere.

In a different technique the double layer of sheet material (180A, 180B) and the air blower 190 are not used. A single sheet of material is, instead, raised on the mast to an elevated position using a crank or pulley system.

FIG. 19 illustrates an effective way in which the flexible sheet material 180 can be attached to the walls 150. The sheet material 180 has a cord or rope 202 enclosed in a seamed peripheral section so that along a periphery 204 of the sheet material a continuous bead 206 is formed. Attached to this bead are a number of extrusions 208. Each extrusion 208 has an undercut channel formation 210 and the bead referred to can be slid into engagement with the channel in a longitudinal direction. The extrusion may be relatively short and a plurality of extrusions may be employed along the periphery of the sheet material. Each extrusion has one or more hook formations 212 and these are engageable, when required, with corresponding formations at the upper edge of the wall 150 in order to attach the sheet material to the wall. Once this has been done the sheet material can be elevated either by using air as described or by hoisting a central section of the sheet material upwardly on the mast using a crank, crane or the like. Both techniques can of course be employed.

One application of the structure described, is in the erection of a reservoir. In this instance the walls 150 are deployed in the manner which has been described and an enclosure is formed. Subsequently the enclosure is lined with a liner 220 of a stout plastics material, see for example FIG. 21. This shows the wall 150 with the liner 220 on an area of the ground 222 which is bounded by a plurality of the walls 150. The liner closely abuts an inner surface 150A, and extends over an upper end 150B, of each wall 150.

At a lower end 150C of each wall two flaps 226, 228 respectively are used. These flaps serve two functions. Firstly an inner flap 226 which is pivotally attached to the wall 150 is movable to seal a gap 230 between the lower end 150C of the wall and the ground 222 and, in this way, the flap provides support for the liner as it moves from the ground to the wall.

Secondly the flap 228 which is positioned on an opposing side of the wall is moved downwardly so that a lower end 232 digs into the ground 222 and provides support for the wall. It is to be borne in mind in this respect that when a liquid e.g. water 242 is placed into the reservoir there is a substantial radial outward pressure exerted by the water and the pressure is at its highest at the lower end of each wall. Thus the flap 228 helps to brace the wall to take this load. Additionally, encircling cables 244 can be located at spaced locations on an outer surface of the walls. These cables extend circumferentially around the walls and help to brace the walls when the reservoir is filled with water.

The flaps 226, 228 are preferably attached with a hinge connection to a lower end 150C of each wall by means of a hinge pin 260 which is not solid but, instead, is in the form of a steel cable. When the flaps 226, 228 are deployed they lie flat on the ground 222, on inner and outer sides of the walls 150A. Part of the liner overlies the inner flap. The walls, despite being braced in this way, may still be inclined to bow under liquid pressure. By using a flexible hinge pin i.e. the cable 260, the walls are allowed to bow to some extent. The cable nonetheless acts to keep the components together and allows the flaps to brace the walls. If the liquid is removed from the reservoir the cable 260, which has not been distorted in any way, simply takes up its original elongate shape. Generally the flaps 226, 228 are not materially affected and the walls have sufficient resilience to take up their substantially planar configurations.

Figure 22:
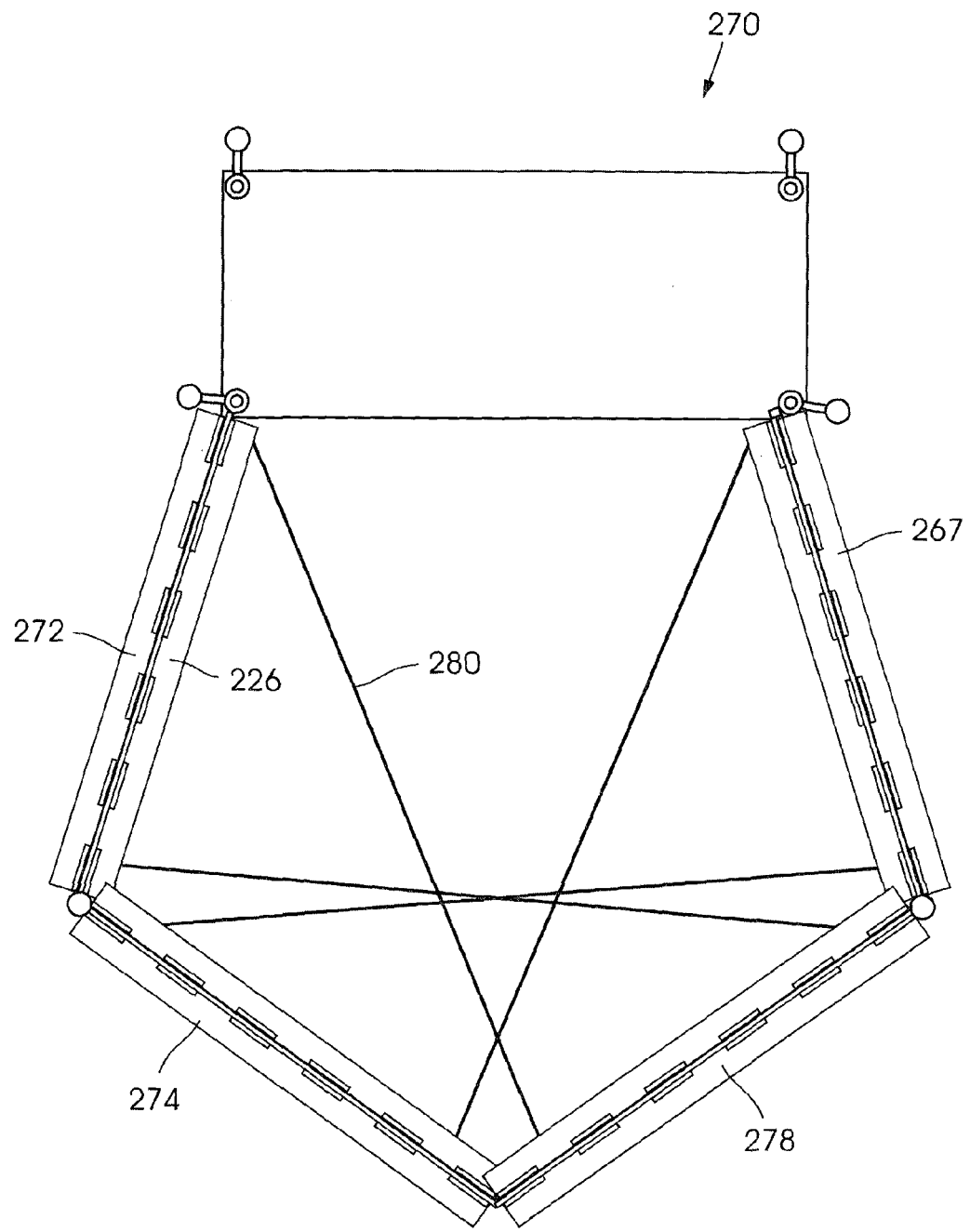

FIG. 22 shows a container 270 from which four articulated walls 272, 274, 276 and 278 are deployed to form a bounded enclosure which is generally in the form of a pentagon. The four walls form four sides of the pentagon and the container forms a fifth side of the pentagon.

Cables 280 stretch between opposing pairs of walls and are tied, directly, to respective edges of inner flaps 226 (of the kind described).

Optionally, a cover in the form of a roof, is placed over the reservoir. The cover may be supported by cables or alternatively may have air-filled "bubbles" which allow the cover to float on a liquid which is introduced into the reservoir.

The invention claimed is:
1. A structure comprising:
  a container which forms a housing of parallelepiped form with a longitudinal axis, and a plurality of walls, the housing including
    a base,
    a roof,
    first and second sides,
    first and second ends,
    first, second, third and fourth corners located respectively at junctions of the first side and first end, and first, second, third and fourth support arrangements located respectively at the first, second, third and fourth corners, each support arrangement respectively including
an elongate member with an upper end fixed to the roof and a lower end fixed to the base,
a cylinder,
a hinge mechanism which secures the cylinder to the elongate member and which permits the cylinder to be moved between an operative position at which the cylinder is displaced from a respective said corner and a storage position at which the cylinder is retracted to said respective corner, and
a piston, telescopically connected to the cylinder, the piston being actuable with the cylinder in the operative position to extend downwardly from the cylinder whereby a lower end of the piston is brought into ground-engaging contact and the piston thereby exerts a force which elevates the housing relative to a ground surface,
wherein at least a first wall of the plurality of walls is substantially rectangular in outline and has
a lower horizontal edge,
an upper horizontal edge,
an inner vertical edge and an outer vertical edge, and
a first pivotal connection which connects the inner vertical edge to the elongate member at the first corner whereby the first wall is pivotally movable about the elongate member, between the storage position at which the first wall is at the first side and is parallel to the longitudinal axis and the deployed position at which the first wall extends transversely to the longitudinal axis.

2. A structure comprising:
a container which forms a housing and a plurality of walls attached to and pivotally movable relative to the housing between a storage position at which the walls are parallel to one another and adjacent the housing and a deployed position at which the walls extend away from the housing and at least partially enclose a ground area,
wherein the housing is of parallelepiped form with a longitudinal axis, the housing including
a base,
a roof,
first and second sides,
first and second ends,
first, second, third and fourth corners located respectively at junctions of the first side and first end, first end and second side, second side and second end, and second end and first side, and
first, second, third and fourth support arrangements located respectively at the first, second, third and fourth corners,
each support arrangement respectively including
an elongate member with an upper end fixed to the roof and a lower end fixed to the base,
a cylinder,
a hinge mechanism which secures the cylinder to the elongate member and which permits the cylinder to be moved between an operative position at which the cylinder is displaced from a respective said corner and a storage position at which the cylinder is retracted to said respective corner, and
a piston telescopically connected to the cylinder, the piston being actuable with the cylinder in the operative position to extend downwardly from the cylinder whereby a lower end of the piston is brought into ground-engaging contact and the piston thereby exerts a force which elevates the housing relative to the ground area, and
wherein at least a first wall of said plurality of walls is substantially rectangular in outline and has
a lower horizontal edge,
an upper horizontal edge,
an inner vertical edge and an outer vertical edge, and
a first pivotal connection which connects the inner vertical edge to the elongate member at the first corner whereby the first wall is pivotally movable about the elongate member, between the storage position at which the first wall is at the first side and is parallel to the longitudinal axis and the deployed position at which the first wall extends transversely to the longitudinal axis.

3. The structure according to claim 2, further comprising sheet material which, with the walls at the deployed position, is supported at an elevated location to provide the roof over the ground area.

4. The structure according to claim 2, further comprising a liquid impervious liner which covers and is located on the ground area and which is supported by substantially vertical surfaces of the walls to create a reservoir.

5. The structure according to claim 2, wherein the roof, the base, and the walls are pivotally secured to respective said corners of the container by respective elongate load-transferring members secured to, and extending between, the roof and the base.

6. The structure according to claim 5, wherein at least one of the walls is pivotally connected to one of said elongate load-transferring members and is movable in the direction of a longitudinal axis of the load-transferring member relative to the load-transferring member.

7. The structure according to claim 2, wherein a second wall of said plurality of walls is substantially rectangular in outline and has
a lower horizontal edge,
an upper horizontal edge,
a first vertical edge and a second vertical edge, and
a second pivotal connection which connects the first vertical edge to the outer vertical edge of the first wall whereby the second wall is pivotally movable about the second pivotal connection relative to the first wall between a first position at which the second wall is adjacent the first wall and a second position at which the second wall extends transversely to the first wall.

8. The structure according to claim 7, wherein the first wall and the second wall form at least part of an enclosure which bounds said ground area, and
the structure further comprises a roof component formed from sheet material which is fixed at least to the upper horizontal edges of the first and second walls and which overlies and is spaced from the ground area.

9. The structure according to claim 7, wherein the first and second walls form at least part of an enclosure which bounds said ground area, and
the structure further comprises a liner, part of which overlies and is in contact with the ground area and part of which bears against and is supported by at least the first and second walls.

10. The structure according to claim 9, wherein the liner is liquid-impervious and forms a reservoir for a liquid.

11. The structure according to claim 10, further comprising a rigidifying mechanism at the lower horizontal edge of the first wall and at the lower horizontal edge of the second wall which braces the respective wall against deformation.

12. The structure according to claim 2, wherein the housing includes
- the first corner to which the first and a second pivotally interconnected walls of the plurality of walls are pivotally secured, and
- the second corner at which third and fourth pivotally interconnected walls of the plurality of walls are pivotally secured.

13. The structure according to claim 2, further comprising sheet material which, with the walls at the deployed position, is supported at an elevated location to provide the roof over the ground area.

14. The structure according to claim 12, further comprising a liquid impervious liner which covers and is located on the ground area and which is supported by substantially vertical surfaces of the walls to create a reservoir.

* * * * *